March 31, 1931.  A. T. SMITH  1,798,763
ELECTRIC STOVE
Filed Dec. 9, 1929  4 Sheets-Sheet 1

Inventor
A. T. Smith

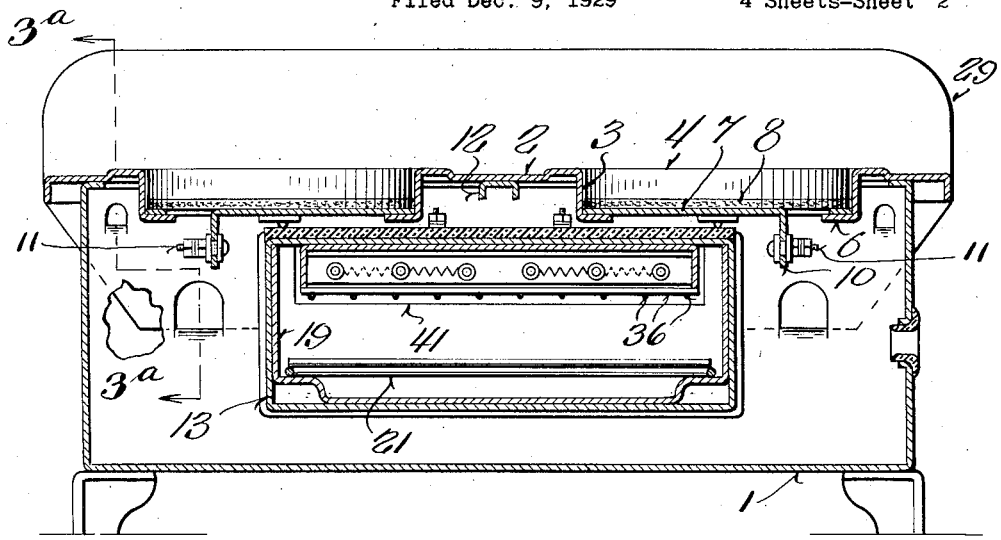

March 31, 1931.  A. T. SMITH  1,798,763
ELECTRIC STOVE
Filed Dec. 9, 1929  4 Sheets-Sheet 3
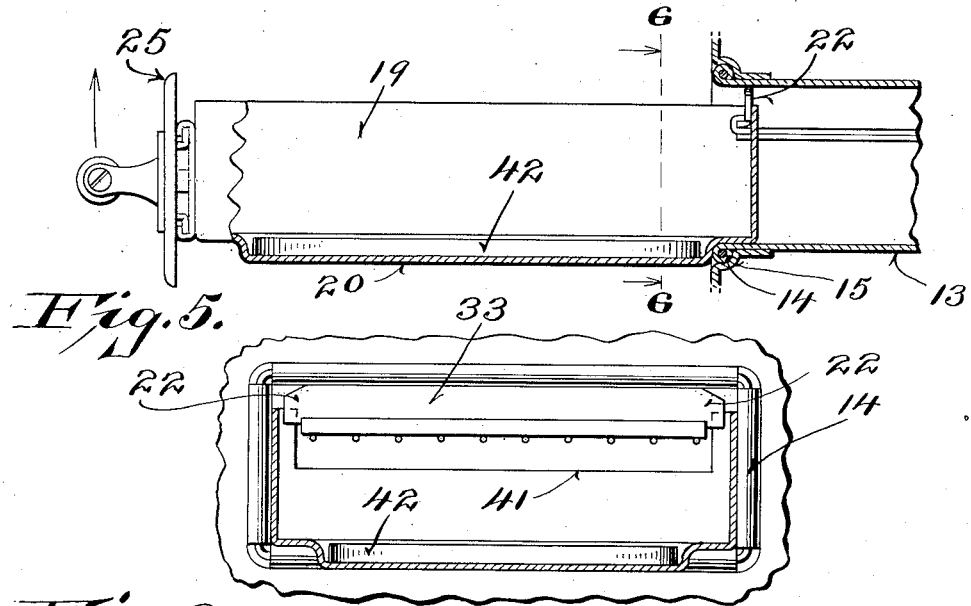
Fig. 5.
Fig. 6.
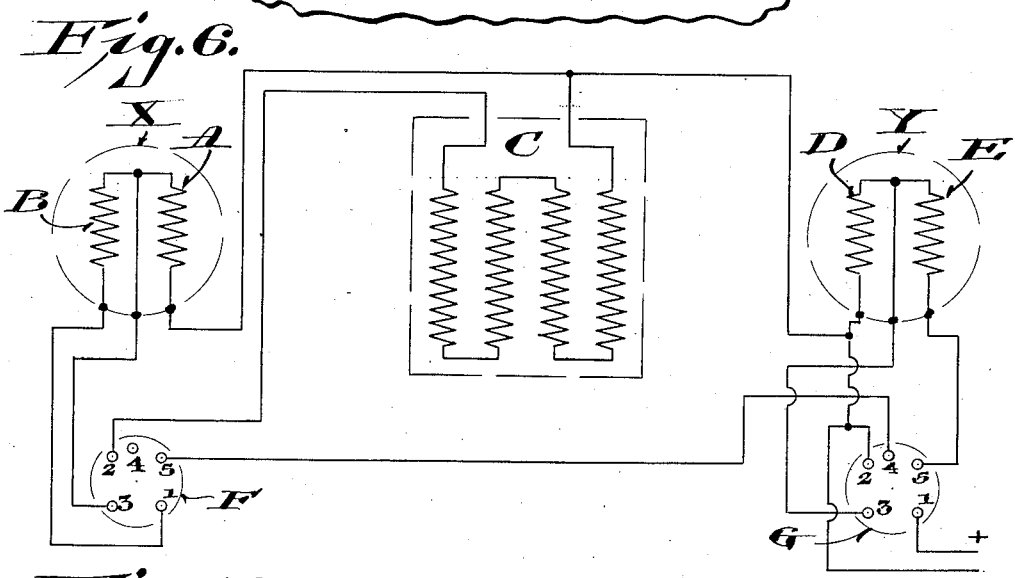
Fig. 7.
Inventor
A. T. Smith
By Young & Young
Attorneys March 31, 1931.  A. T. SMITH  1,798,763
ELECTRIC STOVE
Filed Dec. 9, 1929  4 Sheets-Sheet 4

Inventor
A. T. Smith
By
Attorneys

Patented Mar. 31, 1931

1,798,763

UNITED STATES PATENT OFFICE

ALVA T. SMITH, OF MILWAUKEE, WISCONSIN, ASSIGNOR TO NATIONAL ENAMELING & STAMPING CO. INC., OF MILWAUKEE, WISCONSIN

ELECTRIC STOVE

Application filed December 9, 1929. Serial No. 412,826.

This invention pertains to electric stoves, and has primarily for its object to provide a comparatively simple, compact, inexpensive, and durable structure, which combines conventional surface heating elements with a closed cooking compartment for broiling, baking, and the like.

Incidental to the foregoing, a more specific object resides in the provision of an electric stove having a cooking compartment for the reception of a slidable drawer to receive articles to be cooked, said drawer being readily removable for cleaning purposes, and provided with simple and novel means for supporting the same in projected position to permit convenient access to the contents thereof.

Another object of the invention resides in the provision of a detachable front panel carried by the broiler drawer to form a closure for the cooking compartment and to facilitate cleaning of said plate and drawer.

Another object is to provide a cooking compartment to which access may be had for cleaning, by removal of a detachable rear closure plate.

A still further object resides in the provision of a rear splash plate which is readily detachable to facilitate cleaning of the same.

Another object is to provide the cooking compartment with a quick detachable electric heating element, whereby its replacement or repair is materially facilitated.

A further object is the provision of a heat storage plate for the broiler drawer whereby the same may be utilized for baking as well as broiling.

Another object is to provide a shiftable heating element for the cooking compartment whereby the same may be positioned either above or below the food to be cooked.

A still further object resides in the novel manner of controlling the circuits for the various heating elements, whereby excessive load upon the supply circuit is avoided under all conditions.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a plan elevation of a stove constructed in accordance with the present invention;

Figure 3 is a longitudinal section taken on the line 3—3 of Figure 1;

Figure 3a is a detail section taken on the line 3a—3a of Figure 3;

Figure 4 is a transverse section taken on the line 4—4 of Figure 1;

Figure 5 is a fragmentary detail section illustrating the broiler drawer in extended supported position;

Figure 6 is a transverse section taken on the line 6—6 of Figure 5;

Figure 7 is a diagrammatic view of the wiring circuits;

Figure 1:
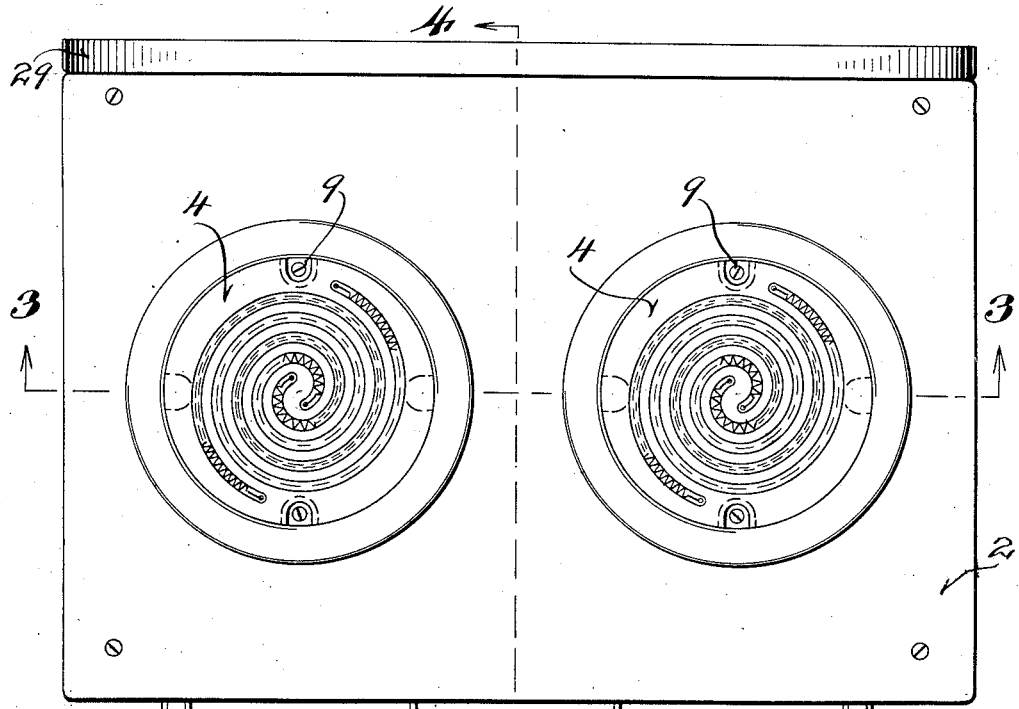

Referring now more particularly to the accompanying drawings, the numeral 1 designates a main casing consisting of a bottom, front, rear, and end walls, to which casing is secured by welding or other suitable means a top plate 2 provided with a plurality of recesses 3 for the reception of electrical surface heating elements 4 which may be of any conventional structure, comprising a plurality of resistance units 5.

The recesses 3 are formed by pressing the metal of the top plate downwardly and terminating the same in lateral projecting retaining lips 6, upon which supporting plates 7 are positioned. Above the supporting plates, insulating pads 8 formed of asbestos or other suitable material, are positioned and receive the elements 4 which are retained in assembled position by screws 9 passing through the elements and the supporting lips 6.

As best shown in Figure 3, the supporting plates 7 are provided with downwardly struck flanges 10 which carry the terminal posts 11 that serve to connect the supply wires with the resistance units 5.

To effect rigidity of the top plate 2, a transverse channel brace 12 is secured thereto and to the front and rear walls of the casing 1.

From the foregoing description taken in connection with the drawings, it will be apparent that an exceedingly simple and inexpensive structure of casing has been provided, in which the conventional surface heating elements 4 may be readily assembled and rigidly supported.

As will be best noted in Figure 4, the front and rear walls of the casing 1 are provided with aligned openings for reception of a cooking compartment 13 comprising top, bottom, and side walls, the forward edges of the walls terminating in a peripheral bead 14 which is received in a recess 15 formed in the front wall of the casing 1 surrounding the front opening heretofore described.

Adjacent the front and rear openings in the casing 1, the walls are provided with inwardly struck flanges 16 which support the compartment 13, the latter being secured in assembled position within the casing by means of the bolts 17 passing through the compartment walls adjacent their forward edges, and the inturned flanges 16.

Here, particular attention is directed to the ease with which the compartment is assembled within the casing, thus eliminating awkward and expensive operations.

Referring again to Figure 3, it will be noted that the rear end of the compartment 13 projects beyond the rear wall of the casing 1 and receives a closure plate 18 which is preferably perforated to permit the escape of vapors and odors from the cooking compartment. Obviously, access to the compartment 13 for cleaning purposes may be gained from either the front or rear, the front being normally open, and the rear closure plate 18 being removable. Such access also facilitates replacement or repair of the heating element positioned within the compartment, as will be hereinafter described.

Slidably mounted within the compartment 13 is a drawer 19 preferably formed from a single blank and provided with a central recessed portion 20 which serves several distinct purposes, in that it will collect and retain juices and liquids from the foods being cooked, as well as to permit circulation of heat within the compartment around the food articles supported upon a suitable rack 21 positioned in the bottom of the drawer.

Also, in the extended position of the drawer, the rear edge of the depression serves to abut the bead 14 formed in the front end of the compartment 13 and in co-operation with the depending lugs 22, which engage the rear wall of the drawer, support the drawer in horizontal extended position, as best shown in Figure 5. The walls of the drawer 19 extend the entire height of the compartment 13 to retain spattering juices and liquids and prevent them from being deposited in the compartment.

Referring to Figures 4 and 5, the front wall of the drawer 19 has secured thereto in any suitable manner, a channel plate 23 which receives the tracks 24 carried by a front plate 25 which serves as a closure for the front of the compartment 13 when the drawer is in retracted position.

The plate 25 is provided with a conventional handle 26 to allow manipulation of the drawer, and secured to the inner face of the plate is a spring detent 27 which drops into a notch 28 formed in the channel plate 23 to yieldably lock the closure plate 25 on the drawer 19. Obviously, the quick detachable feature of the plate 25 materially facilitates cleaning of the same as well as the front portion of the drawer 19.

A rear splash plate 29 straddles the rear projecting portion of the compartment 13, as best shown in Figures 3 and 4, and is detachably connected to the casing 1 by the brackets 30 carried by the rear wall of the casing and projecting through openings 31 provided in the splash plate. Thus, it will be seen that the splash plate may be readily removed for cleaning purposes by simply raising the same to permit withdrawal from the brackets 30.

Mounted within the compartment 13 is an electrical heating element 32 which comprises a shell 33 provided with a plurality of transverse webs 33' which carry the usual insulating sleeves 34 that in turn carry the resistance wires 35 that extend throughout the length of the unit.

A grill of spaced bars 36, detachably secured to the bottom portion of the shell 33, serves to protect the resistance wires 35 against contact with the contents of the broiler drawer 25.

As best illustrated in Figure 4, the shell 33 is provided with keyhole slots 37 which receive the top bolts 17 that serve to secure the compartment 13 to the inturned flange 16 of the casing 1. The rear wall of the shell 33 has secured thereto in any suitable manner the threaded bolts 38 that project through brackets 39 secured to the top of the compartment 13. Obviously, as the nuts 40 are turned down upon the outer ends of the bolts 38, the shell 33 will be drawn rearwardly, causing the bolts 17 to be held within the restricted portion of the keyhole slots 37, thus insuring secure attachment of the unit within the compartment. Likewise, removal of the unit 32 is readily accomplished by running off the nuts 40 and shifting the shell 33 forwardly to release the heads of the bolts 17.

Here, attention is called to the fact that the rear wall of the drawer 19 is cut out at 41 to clear the unit 32 as the drawer is manipulated within the compartment 13, and while complete withdrawal of the drawer from the compartment 13 is normally obstructed by the depending lugs 22, obviously, the same may be accomplished by raising the forward end of the drawer in projected position, so that the rear wall clears the lugs 22.

In instances where it is desired to bake within the compartment 13, plates 42 may be positioned within the recessed portion 20 of the drawer 19, said plates being formed of suitable material to collect and store heat from the element 32, after which the current may be cut off and the stored heat effect the baking operation.

Figure 8:
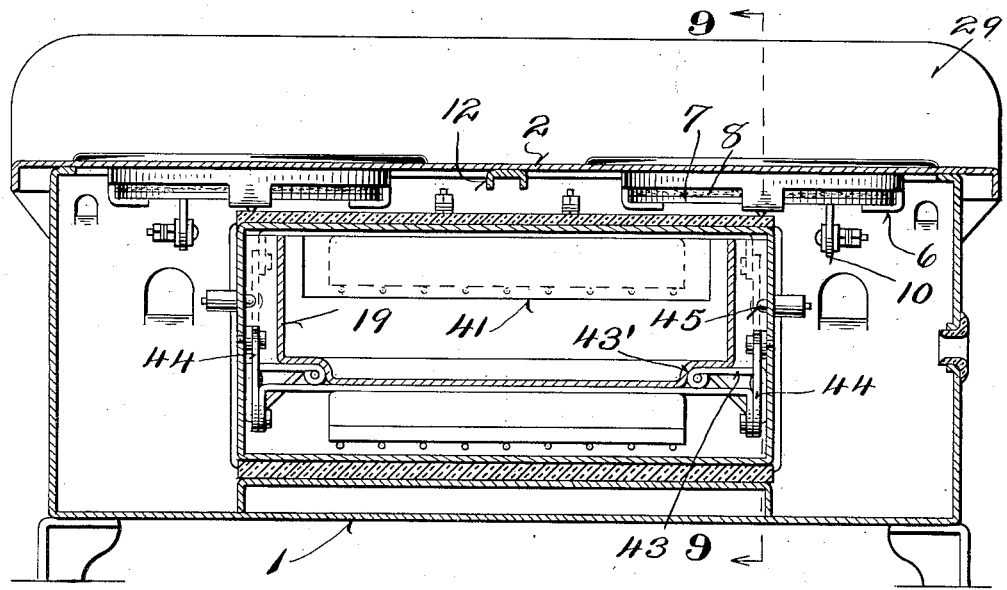
Figure 8 is a longitudinal section illustrating a modified structure.
Figure 9:
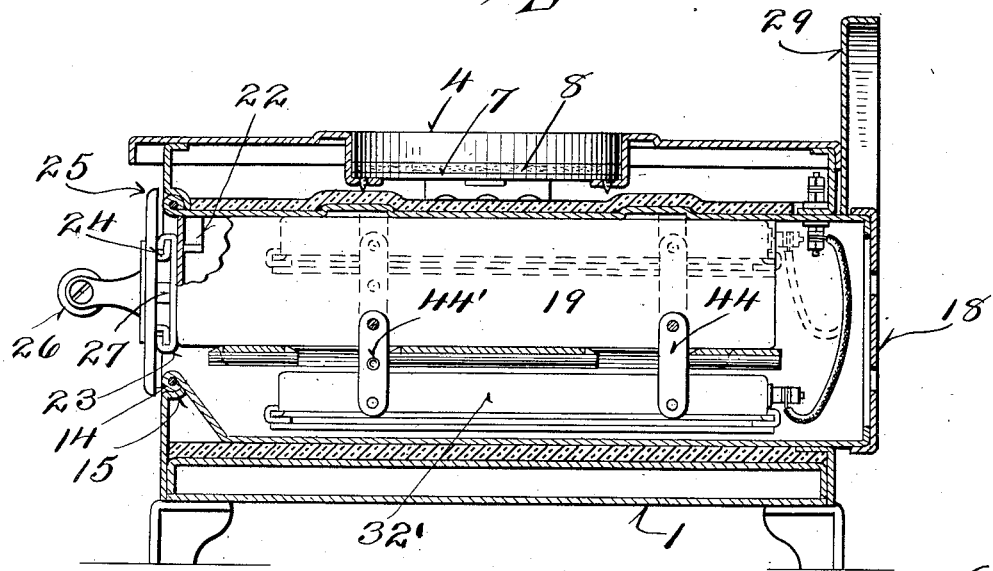
Figure 9 is a transverse section taken on the line 9—9 of Figure 8.

Taking up the modification illustrated in Figures 8 and 9, wherein a shiftable heating element is provided to permit the same to be positioned either above or below the contents of the drawer 19, it will be seen that a pair of tracks 43 are secured to the side walls of the compartment 13, and terminate in beaded edges 43', which engage the sides of the depressed portion formed in the bottom of the drawer 10, thus slidably supporting and guiding the drawer in spaced position from the sides of the compartment 13.

In this form of the invention, the drawer 19 is supported above the bottom of the compartment 13. However, it will be noted that the front opening of the compartment 13 is somewhat restricted, whereby in projected position of the drawer 19, the same will be supported in a similar manner to that illustrated in Figure 5.

Pivotally connected to the sides of the compartment 13, interiorly of the same, are a plurality of links 44, which in turn carry a heating element 32', similar in construction to the element 32. In Figures 8 and 9, the element is illustrated positioned below the drawer 19, but should it be desired, the same may be swung upwardly upon the pivoted links 33 to the position illustrated in dotted lines in Figure 9, in which position recesses 44' (formed in the forward set of links 44 are engaged by the spring detents 45 carried by the sides of the compartment 13 to yieldably latch the element in raised position.

From the foregoing description, taken in connection with the drawings, it will be readily seen that an extremely simple, compact, inexpensive, and durable stove structure has been provided, which combines a closed cooking compartment with the usual surface heating plates, and which through the provision of a slidable drawer, materially facilitates both access to the food to be cooked within the compartment and also renders all parts of the stove extremely accessible for cleaning and replacement or repair of the parts.

It will also be seen that the food cooked within the compartment, and juices or liquids therefrom are all retained within the drawer 19, thus eliminating the necessity of frequent cleaning of the interior of the cooking compartment.

It will further be seen that novel means has been provided for securely supporting the drawer 19 in horizontal projected position, thus making it comparatively easy to handle and inspect the contents of the drawer during the cooking operation.

Figure 2:
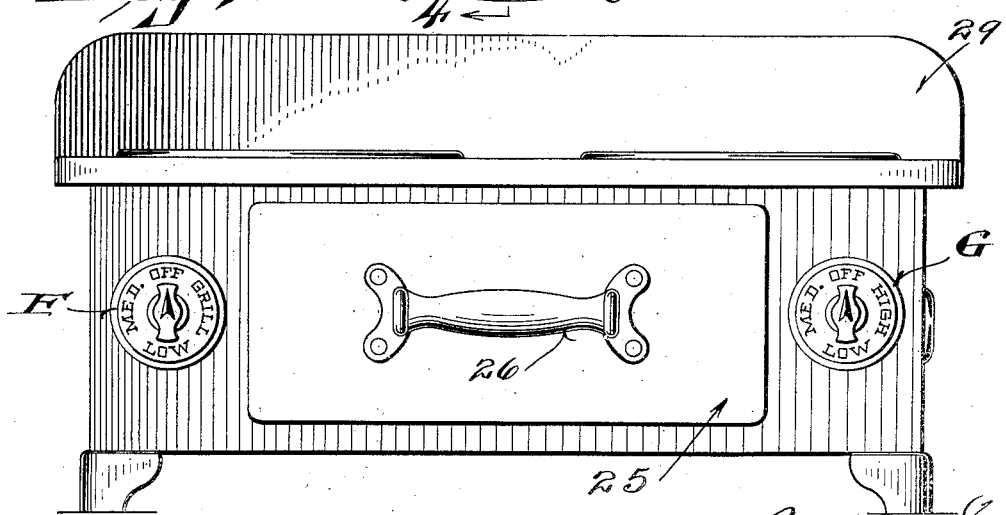
Figure 2 is a front elevation of the same.

As will be noted in Figure 2, two conventional type switches, F and G are provided, for controlling the heating circuits, and this can best be described by reference to the wiring diagram, Figure 7, in which the switch units F and G are illustrated in connection with the surface elements 4, designated in general by the letters X and Y, respectively. The heating element 32 is designated by the letter C, while the two resistance elements in heater X are designated by the letters A and B, and those in element Y, as D and E. Both switches are provided with a plurality of terminals designated by the numerals 1 to 5, inclusive, and as heretofore explained, the switches provide for such connection between the switch terminals as to confine the load upon the supply circuit to a predetermined number of watts.

In the wiring and hook-up, as illustrated, connection of the various circuits is determined by the relative position of the switch handles which provide for connections between the switch terminals in accordance with the following table:

*Switch G*

Handle set at "Off"—terminals 4—1—2—3 connected.
Handle set at "High"—terminals 2—5—3—1 connected. Heat resistance units D and E.
Handle set at "Low"—terminals 1—5—4 connected. D and E in series.
Handle set at "Med."—terminals 3—1—4 connected. Heat resistance D.

*Switch F*

Handle set at "Off"—no teminals connected.
Handle set at "Grill"—terminals 2 and 5 connected. Heat resistance C.
Handle set at "Low"—terminals 1—5 connected. Resistance A and B in series.
Handle set at "Medium"—terminals 3—5 connected. Heat resistance A.

From the foregoing table, taken in connection with diagram, Figure 7, it will be readily seen that selective control of the various heating resistances is readily obtained by manipulation of the switches F and G, the connections between the switch terminals being such that at no time can all of the resistances be thrown into the line, thus overloading the same.

While I have shown and described one form of wiring for various heating elements employed, it is to be understood that various arbitrary arrangements may be employed without in any way departing from the invention, which resides in structural features rather than the mode of operation.

I claim:

1. An electric stove comprising a casing provided with aligned openings in its front and rear walls, a compartment mounted within said openings and open at its front and rear ends, the front edge of said compartment terminating in a peripheral bead abutting the front wall of said casing, a closure plate for the rear end of said compartment, a drawer slidably mounted within said compartment, and a heating element positioned within and carried by said compartment.

2. An electric stove comprising a casing, a compartment mounted within said casing and open at its forward end, a drawer slidably mounted within said compartment provided with a depression in its bottom for abutting engagement with the front of said casing when the drawer is projected, means for obstructing removal of said drawer and abutting engagement of said drawer with the front of said casing to support the same in projected position, and a heating element positioned within and carried by said compartment.

3. An electric stove comprising a casing, a compartment mounted within said casing and open at its forward end, said end terminating in a peripheral bead abutting the front of said casing, a drawer slidably mounted within said compartment and provided with an offset depending portion for abutting engagement with the lower portion of said bead when the drawer is projected, means carried by the compartment for engagement with said drawer when projected to obstruct its removal and assist in supporting the same in horizontal projected position, and a heating element positioned within and carried by said compartment.

4. An electric stove comprising a casing, a compartment mounted within said casing and open at its forward end, a drawer slidably mounted within said compartment, a channel plate secured to the front wall of said drawer, a closure plate slidable in said channel plate to normally close the open end of said compartment when the drawer is retracted, and means for yieldably latching said plate to said channel plate.

5. An electric stove comprising a casing, a compartment mounted within said casing and open at its forward end, a drawer slidably mounted within said compartment, a heating element positioned within and carried by said compartments, an electric heating element positioned in the top of said casing, and a splash plate detachably secured to the rear of said casing and extending above the same.

6. An electric stove comprising a casing, a compartment mounted within said casing and open at its forward end, a drawer slidably mounted within said compartment, a heating element positioned within and carried by said compartment, an electric heating element positioned in the top of said casing, brackets carried by said casing, a rear splash plate detachably mounted upon said brackets and projected above the top of said casing.

7. An electric stove comprising a casing, a compartment mounted within said casing and open at its forward end, a drawer slidably mounted within said compartment, and an electric element pivotally mounted within said compartment for positioning above or below said drawer.

8. An electric stove comprising a casing, a compartment mounted within said casing and open at its forward end, a drawer slidably mounted within said compartment, parallel links pivotally secured to the side walls of said compartments, and an electrical heating element pivotally carried by said links for positioning above or below said drawer.

9. An electric stove comprising a casing, a compartment mounted within said casing and open at its forward end, a drawer slidably mounted within said compartment, parallel links pivotally secured to the side walls of said compartment, an electrical heating element pivotally carried by said links for positioning above or below said drawer, and means for releasably latching said element in raised position.

10. An electric stove comprising a casing provided with aligned openings in its front and rear walls, inwardly struck flanges surrounding said openings, a compartment mounted within said openings and carried by said flanges, said compartment being open at its front and rear ends, a closure plate for the rear end of said compartment, a drawer slidably mounted within said compartment, a closure plate carried by the front wall of said drawer to effect closure of the front of said compartment when the drawer is retracted, and an electric heating element positioned within and carried by said compartment.

11. An electric stove comprising a casing provided with aligned openings in its front and rear walls, inturned flanges surrounding said openings, the front wall of said casing being provided with a recess surrounding said opening, a compartment positioned within said openings and open at its front and rear ends, the front of said compartment terminating in a peripheral bead for engagement in the recess formed in the front wall of said casing, means for locking the compartment within said casing, a closure for the rear end of said compartment, an electrical heating element detachably mounted within said compartment, a drawer slidably mounted within said compartment, means for obstructing complete withdrawal of said drawer and supporting the same in projected position, and a plate carried by the front of said drawer for closing the front of said compartment when said drawer is retracted.

In testimony that I claim the foregoing I have hereunto set my hand at Milwaukee, in the county of Milwaukee and State of Wisconsin.

ALVA T. SMITH.